(12) United States Patent
Jol et al.

(10) Patent No.: US 9,853,507 B2
(45) Date of Patent: Dec. 26, 2017

(54) SELF-LOCATING INDUCTIVE COIL

(71) Applicant: Apple Inc., Cupertino, CA (US)

(72) Inventors: Eric S. Jol, Cupertino, CA (US); Ibuki Kamei, Cupertino, CA (US); Warren Z. Jones, San Jose, CA (US)

(73) Assignee: Apple Inc., Cupertino, CA (US)

( * ) Notice: Subject to any disclaimer, the term of this patent is extended or adjusted under 35 U.S.C. 154(b) by 544 days.

(21) Appl. No.: 14/269,727

(22) Filed: May 5, 2014

(65) Prior Publication Data

US 2015/0318709 A1     Nov. 5, 2015

(51) Int. Cl.
| | |
|---|---|
| *H01F 38/00* | (2006.01) |
| *H02J 50/90* | (2016.01) |
| *H02J 5/00* | (2016.01) |
| *H01F 41/00* | (2006.01) |
| *H01F 38/14* | (2006.01) |

(52) U.S. Cl.
CPC .............. *H02J 50/90* (2016.02); *H01F 41/00* (2013.01); *H02J 5/005* (2013.01); *H01F 38/14* (2013.01); *Y10T 29/49021* (2015.01)

(58) Field of Classification Search
CPC ............ H02J 7/025; H02J 5/005; H01F 38/14
USPC .......................................................... 307/104
See application file for complete search history.

(56) References Cited

U.S. PATENT DOCUMENTS

| | | | |
|---|---|---|---|
| 7,477,039 B2 | 1/2009 | Rodarte et al. | |
| 7,710,071 B2 | 5/2010 | Elizalde Rodarte | |
| 7,948,208 B2 | 5/2011 | Partovi et al. | |
| 7,952,322 B2 | 5/2011 | Partovi et al. | |
| 8,169,185 B2 | 5/2012 | Partovi et al. | |
| 8,248,025 B2 | 8/2012 | Sip | |
| 8,305,036 B2 * | 11/2012 | Toya ..................... | H02J 7/025 320/107 |
| 8,497,657 B2 | 7/2013 | Franks et al. | |
| 8,629,652 B2 | 1/2014 | Partovi et al. | |
| 8,629,654 B2 | 1/2014 | Partovi et al. | |
| 8,890,470 B2 | 11/2014 | Partovi | |
| 8,896,264 B2 | 11/2014 | Partovi | |
| 8,901,881 B2 | 12/2014 | Partovi | |
| 8,912,686 B2 | 12/2014 | Stoner et al. | |
| 8,947,047 B2 | 2/2015 | Partovi et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,178,369 B2 | 11/2015 | Partovi | |

(Continued)

FOREIGN PATENT DOCUMENTS

| | | |
|---|---|---|
| EP | 0977297 | 2/2000 |
| WO | WO2009105615 | 8/2009 |
| WO | WO2013035282 | 3/2013 |

*Primary Examiner* — Alfonso Perez Borroto
(74) *Attorney, Agent, or Firm* — Kilpatrick Townsend & Stockton LLP (57) ABSTRACT

Methods and systems for automatically aligning a power-transmitting inductor with a power-receiving inductor. One embodiment includes multiple permanent magnets coupled to and arranged on a surface of a movable assembly accommodating a power-transmitting inductor. The permanent magnets encourage the movable assembly to freely move and/or rotate via magnetic attraction to correspondingly arranged magnets within an accessory containing a power-receiving inductor.

15 Claims, 7 Drawing Sheets

(56) References Cited

U.S. PATENT DOCUMENTS

| | | |
|---|---|---|
| 2009/0096413 A1* | 4/2009 | Partovi .................. H01F 5/003 |
| | | 320/108 |
| 2010/0181841 A1* | 7/2010 | Azancot ................. H01F 38/14 |
| | | 307/104 |
| 2011/0050164 A1 | 3/2011 | Partovi et al. |
| 2011/0175455 A1* | 7/2011 | Hashiguchi ............. H02J 17/00 |
| | | 307/104 |
| 2011/0221385 A1 | 9/2011 | Partovi et al. |
| 2012/0146576 A1* | 6/2012 | Partovi ................ H01F 7/0252 |
| | | 320/108 |
| 2012/0164849 A1 | 6/2012 | Lee et al. |
| 2012/0315771 A1 | 12/2012 | Greig et al. |
| 2013/0093388 A1 | 4/2013 | Partovi |
| 2013/0099563 A1 | 4/2013 | Partovi et al. |
| 2013/0249479 A1 | 9/2013 | Partovi |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0136549 A1 | 11/2013 | DiFonzo et al. |
| 2013/0300204 A1 | 11/2013 | Partovi |
| 2014/0103873 A1 | 4/2014 | Partovi et al. |
| 2014/0132210 A1 | 5/2014 | Partovi |
| 2014/0191568 A1 | 7/2014 | Partovi |
| 2014/0217970 A1 | 8/2014 | Tabata et al. |
| 2014/0306654 A1 | 10/2014 | Partovi |
| 2015/0130412 A1 | 5/2015 | Partovi |
| 2015/0145475 A1 | 5/2015 | Partovi et al. |
| 2015/0270046 A1 | 9/2015 | Golko et al. |
| 2015/0280483 A1 | 10/2015 | Golko et al. |
| 2015/0349571 A1 | 12/2015 | Wagman et al. |

\* cited by examiner

SELF-LOCATING INDUCTIVE COIL

TECHNICAL FIELD

Embodiments described herein relate to electromagnetic power transfer systems, and in particular to systems and methods for facilitating alignment of an inductive power transmitter to an inductive power receiver.

BACKGROUND

Portable electronic devices may include one or more batteries that may require recharging from time to time. Such devices may include electric vehicles, cell phones, smart phones, tablet computers, laptop computers, wearable devices, navigation devices, sports devices, health devices, medical devices, location tracking devices, accessory devices, home appliances, peripheral input devices, remote control devices, and so on.

Some batteries may recharge wirelessly by accepting inductive power provided by an inductive power transmitter. For instance, a battery-powered electronic device configured to accept inductive power may be placed nearby a transmitter adapted to produce inductive power. In these systems, a transmitting coil within the transmitter may produce a time-varying electromagnetic flux that may induce a current within a receiving coil within the device. The received current may be used to replenish the charge of a rechargeable battery.

In many examples, imperfect alignment of the transmitting coil and receiving coil may result in power transfer efficiency losses.

Accordingly, there may be a present need for a system and method for aligning coils of an electromagnetic power transfer system.

SUMMARY

Embodiments described herein may relate to, include, or take the form of methods and systems for aligning a power-transmitting inductor with a power-receiving inductor.

For example, certain embodiments described herein may relate to or take the form of a power transfer apparatus ("dock") including at least a housing, a power supply, and a power-transmitting inductor. The housing includes an interface surface on which a user may place a power receiving apparatus ("accessory"). The power supply may have at least an active state and an inactive state, and may be configured to switch between the states at a selectable duty cycle. The power-transmitting inductor may be coupled to the power supply and may be disposed within the housing below the interface surface.

In many embodiments, the power-transmitting inductor is movable below the interface surface. For example, the power-transmitting inductor may translate in a first or second direction within a plane that is parallel to the interface surface. In this manner, the power-transmitting inductor may move below the interface surface to align with the accessory wherever the accessory is placed on the dock.

Other embodiments may include a configuration in which translation of the power-transmitting inductor may be controlled by a centering component such as a spring, a linear bearing, elastomer, and/or low viscosity fluid. The centering component may assist with the movement and translation of the power-transmitting inductor.

Still other embodiments may include a structural member positioned below the interface surface and within the housing. The structural member may be configured for translation within a plane substantially parallel to the interface surface. In many examples, the power-transmitting inductor may rigidly couple to the structural member.

Further embodiments may include further that may include a magnetic field source coupled to the power-transmitting inductor and translatable with the magnetic field source.

Further embodiments may include a controller coupled to the structural member or power-transmitting inductor and configured to receive a signal to translate the power-transmitting inductor. The controller may translate the power-transmitting inductor in a first direction to a first distance in response to the signal. The controller may translate the power-transmitting inductor in a second direction and to a second distance response to another signal.

Other embodiments described herein may relate to, include, or take the form of a method of positioning a coil within an inductive power transmitter, including at least the operations of providing an interface surface to receive an inductive power receiver, providing a structural member below the interface surface and configured to translate within a plane substantially parallel to the interface surface, providing an inductive coil affixed to the structural member, receiving the inductive power receiver at a first location on the interface surface, and translating the structural member below the interface surface to a second location axially aligned with the first location on the interface surface.

Still further embodiments described herein may relate to, include, or take the form of a method of positioning a coil within an inductive power transmitter, including at least the steps of disposing a structural member below an interface surface for receiving an inductive power receiver, the structural member configured for translation within a plane substantially parallel to the interface surface, affixing an inductive coil to the structural member, receiving the inductive power receiver at a location on the interface surface, providing inductive power to the inductive power receiver by the inductive power transmitter, receiving a first signal from the inductive power receiver, the signal that may include information about the power received by the inductive power receiver, and in response to receiving the first signal, translating the structural member in a first direction. Other embodiments may continue by providing the operations of receiving a second signal from the inductive power receiver, and in response to receiving the second signal, translating the structural member in a second direction.

BRIEF DESCRIPTION OF THE FIGURES

Reference will now be made to representative embodiments illustrated in the accompanying figures. It should be understood that the following descriptions are not intended to limit the disclosure to one preferred embodiment. To the contrary, it is intended to cover alternatives, modifications, and equivalents as may be included within the spirit and scope of the described embodiments as defined by the appended claims.

The use of the same or similar reference numerals in different drawings indicates similar, related, or identical items.

DETAILED DESCRIPTION

Embodiments described herein may relate to, include, or take the form of methods and systems for aligning a power-transmitting inductor with a power-receiving inductor.

An inductive power transfer system may include an inductive power-transmitting component or device to transmit power and an inductive power-receiving component or device to receive power. In some examples, a battery-powered electronic device includes an inductive power-receiving component configured to charge one or more internal batteries. Example battery-powered electronic devices may include media players, media storage devices, personal digital assistants, tablet computers, cellular telephones, laptop computers, smart phones, styluses, global positioning sensor units, remote control devices, wearable devices, electric vehicles, home appliances, location tracking devices, medical devices, health devices, sports devices, accessory devices, and so on. Example inductive power transmitting devices may include docks, stands, clips, plugs, mats, attachments, and so on.

In many examples, a battery-powered electronic device ("accessory") may be positioned on a power-transmitting device or surface ("dock"). In these systems, an electromagnetic coil within the dock ("transmit coil") may produce a time-varying electromagnetic flux ("transmitting power") to induce a current within an electromagnetic coil within accessory ("receive coil"). In other examples, a transmit coil may produce a static electromagnetic field and may physically move, shift, or otherwise change its position to produce a spatially-varying electromagnetic flux to induce a current within the receive coil.

The accessory may use the received current to replenish the charge of a rechargeable battery ("receiving power") or to provide power to operating components. In other words, when the accessory is positioned on the dock, the dock may transmit power via the transmit coil to the receive coil of the accessory.

In many cases, the dock may be configured to provide sustained power transmission to the accessory for a selected or otherwise limited time. For example, the dock may suspend sustained power transmission once the rechargeable battery of the accessory is replenished. In other examples, the dock may be configured to vary the amount of power transmitted to the accessory in response to changes in the power requirements of the accessory. For example, the dock may use information received or measured from the accessory to dynamically, intelligently, and rapidly adjust the power transmitted to the accessory.

In certain embodiments, a transmit coil and receive coil are substantially annular and oriented to face and be substantially parallel to one another. If misaligned, the power transfer efficiency between the transmit coil and the receive coil decreases substantially. In many circumstances, decreased power transfer efficiency is undesirable. For example, the accessory may receive less power than desired to charge an internal battery at an optimal rate. To account for imperfectly aligned coils, conventional designs typically increase the power to the transmit coil in order to increase the power received by the accessory. The power lost due to transfer inefficiencies may be dissipated as heat and/or may be absorbed by (or may interfere with) other electronic devices or components nearby.

In other examples, a relatively small misalignment of the transmit and receive coils may only cause a slight decrease in power transfer efficiency. Conventional designs may inform or instruct a user to adjust the positioning of the accessory or dock in order to optimize power transfer efficiency. For example, an accessory may alert the user of imperfect alignment by sound, light, vibration, or by displaying a message on a screen. A user may be frustrated or inconvenienced if required to realign the accessory with the dock.

In still further examples, an accessory may ignore power transfer efficiency losses and instead may charge an internal battery at a lower rate. In these examples, a user may be frustrated or inconvenienced due to inconsistent accessory recharge times.

Accordingly, embodiments described herein relate to, include, and take the form of methods and systems for automatically aligning a transmit coil with a receive coil. Many embodiments may include a movable transmit coil. In these embodiments, the transmit coil may be configured to move in two dimensions on or below a surface. For example, a transmit coil may be connected to two bearings. The bearings may allow for translation along one or more axes. In many examples, the bearings may be spherical or substantially spherical bearings positioned below the transmit coil. In other examples, the bearings may be two or more linear bearings. For example, one linear bearing may allow for translation along the X-axis, and the other linear bearing may allow for translation along the Y-axis. In this manner, the transmit coil may translate freely within a two dimensional plane defined by the linear bearings.

Furthering the example, another embodiment may include a configuration in which the transmit coil is attached to an intermediate structural member that is itself attached to the one or more linear bearings. In this manner, the structural member and the transmit coil may form a single movable assembly that is configured to translate freely in a two-dimensional plane. In other examples, the movable assembly may be additionally configured to freely rotate.

Still furthering the example, another embodiment may include one or more permanent magnets rigidly coupled to the movable assembly. The permanent magnets may encourage the assembly to freely translate or rotate by magnetic attraction in the two-dimensional plane defined by the linear bearings. In this case, an accessory may also include permanent magnets to attract the movable assembly to a particular position. In other words, and more particularly, an accessory containing permanent magnets may attract a movable assembly within a dock.

In many examples, the arrangement of permanent magnets on the movable assembly may be the same as the arrangement of permanent magnets within the accessory. For example, a dock may include four magnets arranged in a square, positioned along the perimeter of the movable assembly. The transmit coil may be positioned central to the square defined by the arrangement of magnets. Correspondingly, an accessory may include four permanent magnets arranged in a square having the same dimensions as the arrangement on the movable assembly. The receive coil may be positioned central to the square defined by the arrangement of magnets in the accessory. In this manner, when the magnets of the accessory attract the magnets within the dock, the movable assembly in the dock may move such that each of the four dock magnets attract and align with a corresponding one of the four accessory magnets. As a result of the alignment of the magnets, the transmit and receive coils may be substantially aligned along the same axis.

Other embodiments may include one or more centering components instead of, or in addition to, the linear bearings. The centering components may couple the housing of the dock to the movable assembly. The centering components may bring the movable assembly back to a substantially centralized location (with respect to the housing of the dock) when an accessory is removed from the dock. In this manner, the movable assembly may occupy substantially the same position every time a user positions the accessory on the dock.

For example, in certain embodiments, a centering component may be a spring connected between a housing of the dock and the movable assembly. In this example, the movable assembly may translate off-center (with respect to the housing of the dock) while the accessory is present and positioned off-center. In this manner, the movable assembly may move within the dock to align with the accessory regardless where the accessory is placed on the dock. When the accessory is removed, the spring may provide a restoring force that brings the movable assembly back to the centralized position.

Although the aforementioned embodiments (and those deriving from, including, and relating thereto) generally describe translating a movable assembly within a dock, the methods and systems described may equally apply to a movable assembly within an accessory. In still further examples, both a dock and an accessory may include movable assemblies.

In addition, although the aforementioned embodiments (and those deriving from, including, and relating thereto) generally describe passive movement of a movable assembly (e.g., permanent magnets), electronically controllable movement may be desirable in alternate or additional embodiments. For example, a movable assembly may be moved by use of electromagnetic fields, motors, actuators, shape memory alloys, or by any other suitable electronically controllable means. As one example, linear actuators may be substituted for linear bearings.

Figure 1:
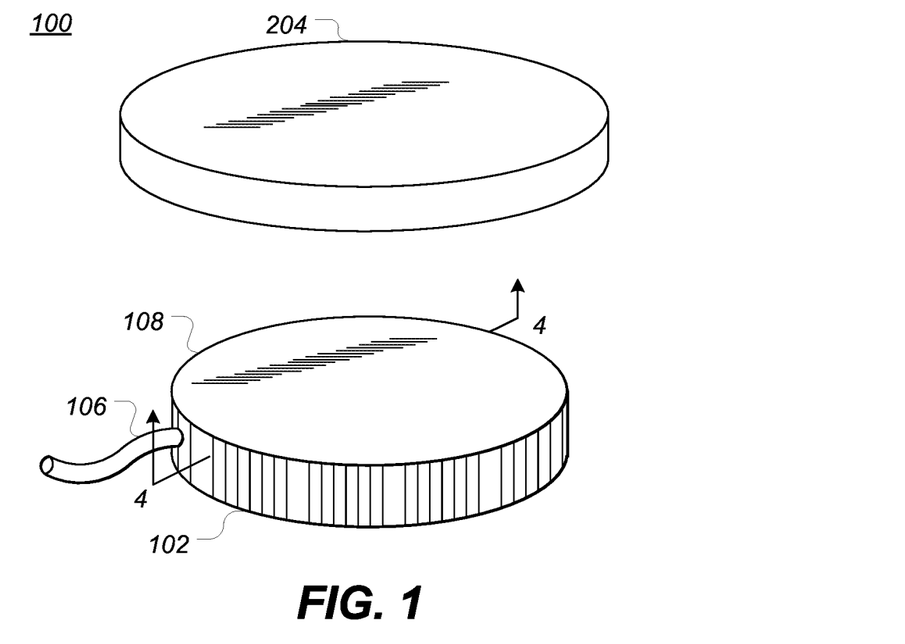
FIG. 1 depicts a front perspective view of an example inductive power transfer system in an unmated configuration.

FIG. 1 depicts a front perspective view of an example inductive power transfer system in an unmated configuration. The system 100 may include an inductive power transmitter 102 and an inductive power receiver 204. The inductive power transmitter 102 and the inductive power receiver 204 may each respectively include a housing to enclose electronic components therein. In many examples, and as depicted, the inductive power receiver 204 may have a larger lateral cross section than that of the inductive power transmitter 102, although such a configuration is not required. In other examples, the inductive power transmitter 102 may have a larger lateral cross section than that of the inductive power receiver 204. In still further examples, the cross sections may be substantially the same and/or may take differing shapes. For example, an inductive power receiver may be substantially rectangular and an inductive power transmitter may be substantially circular In the illustrated embodiment, the inductive power transmitter 102 may be connected to a power source such as an alternating current power outlet by power cord 106. In other embodiments, the inductive power transmitter 102 may be battery operated. In still further examples, the inductive power transmitter 102 may include a power cord 106 and an internal or external battery. Similarly, although the embodiment is depicted is shown with the power cord 106 coupled to the housing of the inductive power transmitter 102, the power cord 106 may be connected by any suitable means. For example, the power cord 106 may be removable and may include a connector that is sized to fit within an aperture or receptacle opened within the housing of the inductive power transmitter 102.

In various implementations and embodiments, either or both of the inductive power transmitter 102 and the inductive power receiver 204 may be included within an electronic device such as a cell phone, smart phone, tablet computer, laptop computer, wearable device, navigation device, sports device, health monitoring device, medical device, accessory device, peripheral input device, and so on. For example, the inductive power receiver 204 may be included within the housing of a cellular telephone. In such an example, the inductive power receiver may be entirely or partially concealed by the housing of the cellular telephone. In other examples, the inductive power receiver 204 may be formed in or along a back surface of an electronic device. In still other embodiments, the inductive power receiver 204 may be included as an accessory for an electronic device, such as within a protective case for a cellular telephone.

As shown, the inductive power receiver 204 may include a lower surface that may interface with, align or otherwise contact an interface surface 108 of the inductive power transmitter 102. In this manner, the inductive power receiver 204 and the inductive power transmitter 102 may be positionable with respect to each other. In certain embodiments, the interface surface 108 may be configured in a particular shape that mates with a complementary shape of the inductive power receiver 204. For example, the interface surface 108 may include a concave shape that follows a selected curve. A bottom surface of the inductive power receiver 204 may include a convex shape following the same or substantially similar curve as the interface surface 108. In other examples, the interface surface 108 may be substantially flat, as illustrated.

Figure 2:
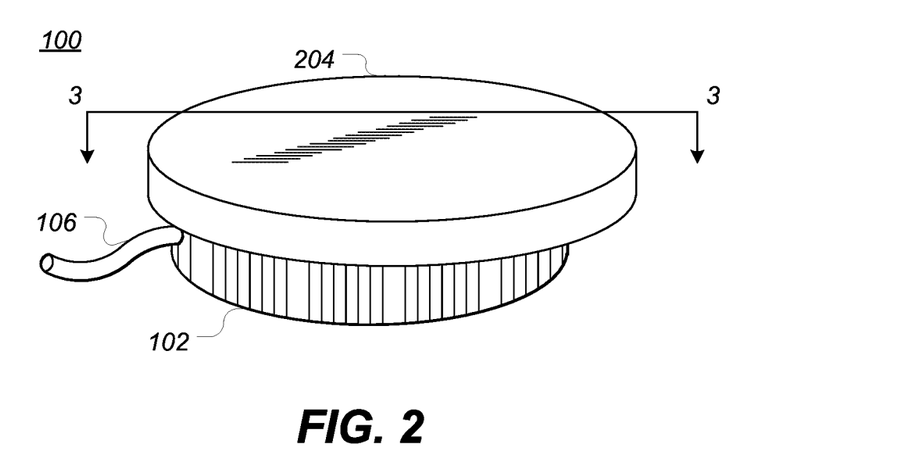
FIG. 2 depicts the example inductive power transfer system of FIG. 1 in a mated configuration.

FIG. 2 depicts the example inductive power transfer system of FIG. 1 in a mated configuration, after the inductive power receiver 204 is placed on the interface surface of the inductive power transmitter 102. In many embodiments, the inductive power receiver 204 may be placed on the interface surface in any position. For example, as illustrated, the inductive power receiver 204 may be placed in an arbitrary position relative to the inductive power transmitter 102.

Figure 3:
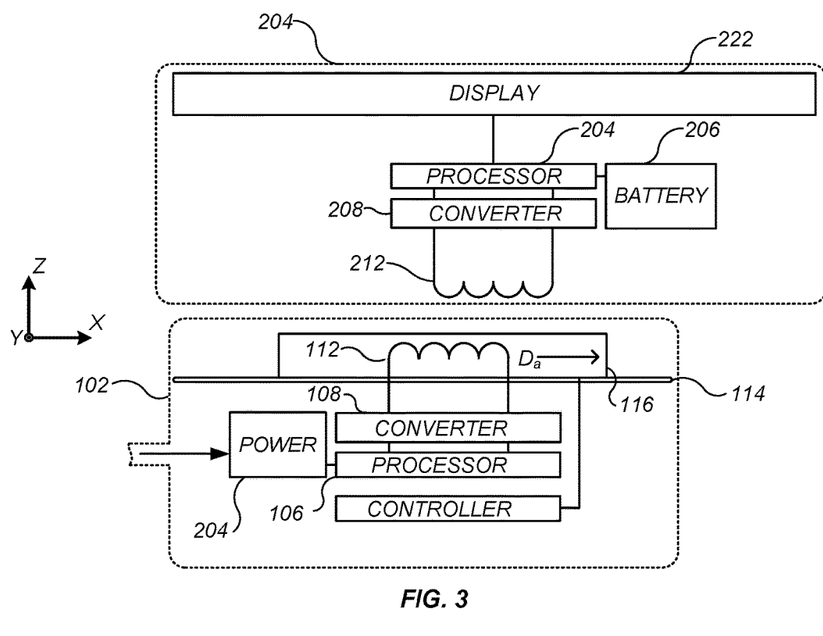
FIG. 3 depicts a simplified signal flow block diagram of a sample inductive power transfer system.

FIG. 3 depicts a simplified schematic block diagram of a sample inductive power transfer system taken along line 3-3 of FIG. 2. The inductive power transfer system may include one or both of an inductive power transmitter 102 and an inductive power receiver 204 which may be separated by an air gap. The inductive power receiver 204 is depicted positioned on a top surface of the inductive power transmitter 102, although such a configuration is not required.

The inductive power transmitter 102 may include a clock connected to a processor 104 and a direct current converter 108. The clock can generate one or more timing signals for the inductive power transfer system. The processor 104 may be coupled to a power supply 106, such as a direct current power supply. In certain embodiments, the processor 104 may control the state of the direct current converter 108, which has power input from the power supply 106. In one embodiment, the clock generates periodic signals that are used by the processor 104 to activate and deactivate switches in the direct current converter 108. The switches may convert the direct current from the power supply 106 to alternating current suitable for exciting a transmit coil 112.

In many examples, the transmit coil 112 may be rigidly coupled to a movable assembly 116. The movable assembly 116 may be configured for movement in one or more directions, in one or more dimensions. For example, in the illustrated embodiment, the movable assembly 116 may move in the direction $D_a$ in order to align the transmit coil 112 with a receive coil 212 in the inductive power receiver 204. In other embodiments, the movable assembly 116 may move in other directions. For example, the movable assembly may move closer to a top surface (e.g., along a Z-Axis) of the inductive power transmitter 102.

In these embodiments, the transmitter 102 of the inductive power transfer system may be configured to provide a time-varying signal to the transmit coil 112 in order to induce a voltage within the receive coil 212 in the receiver through inductive coupling with the transmit coil 112. In this manner, power may be transferred from the transmit coil 112 to the receive coil 212. The signal produced in the receive coil 212 may be received by a direct current converter 208 that converts the signal into a direct current signal that may be used to replenish a battery 206. Any suitable direct current converter 208 can be used in the inductive power transfer system. For example, in one embodiment, a rectifier may be used as a direct current converter. A programmable load such as a processor 204 may then receive the direct current signal.

Figure 4A:
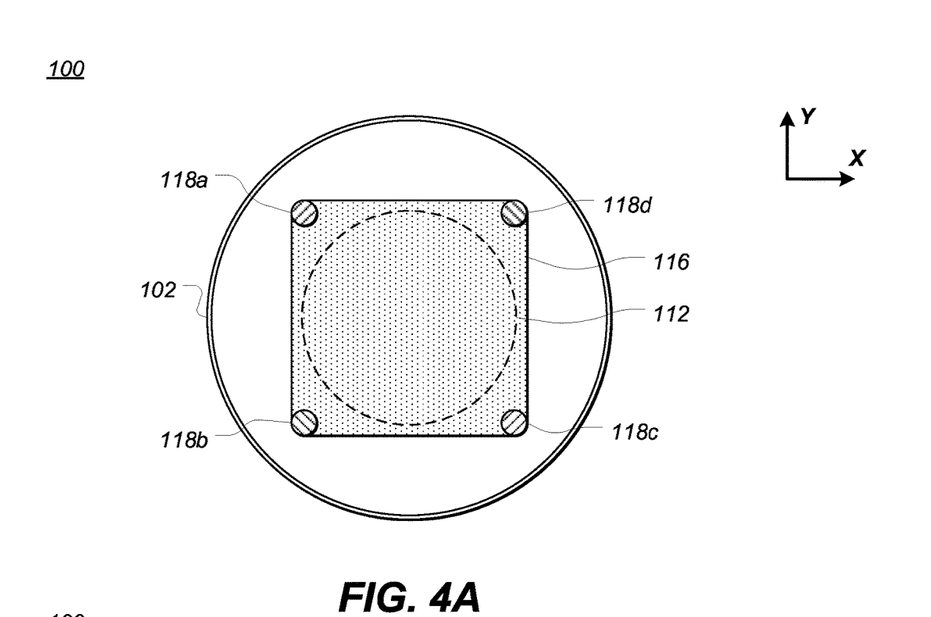
FIG. 4A depicts a bottom cross-section plan view taken along line 4-4 of the example power transfer system of FIG. 1 showing a movable assembly in a centralized position.

FIG. 4A depicts a bottom cross-section plan view of the example power transfer system 100 of FIG. 1, showing a movable assembly 116 within an inductive power transmitter 102. As depicted, the inductive power transmitter 102 has a circular shape, although such a shape is not required. Other embodiments may include an inductive power transmitter 102 with a square, rectangular, oval, or any other suitable shape.

The movable assembly 116 is depicted in a substantially central position. The movable assembly 116 may include a structural member such as a substrate, one or more magnetic field sources, such as magnets 118a-d, and an inductive power transmitting coil 112, shown as a dashed circle. The magnets 118a-d may encourage the movable assembly 116 to freely translate and/or rotate by magnetic attraction in the two-dimensional plane beneath the interface surface of the inductive power transmitter 102. Although not illustrated, the translation of the movable assembly 116 may be guided, assisted, or otherwise influenced by one or more guides. For example, one or more bearings positioned below the movable assembly 116 may assist the movable assembly 116 to translate in the X and Y axes.

In many examples, the arrangement of magnets 118a-d on the movable assembly 116 may be the same as an arrangement of permanent magnets within a corresponding inductive power receiver, such as shown in FIG. 1. In many cases, the magnets 118a-d may be disposed with magnetic poles facing in the same direction. For one example, all north poles of the magnets 118a-d may face toward the interface surface 108 of the inductive power transmitter 102. Correspondingly, the magnets within the inductive power receiver may be aligned such that all south poles face the bottom surface of the inductive power receiver. In other examples, the poles of the magnets 118a-d may be arranged in a pattern. For example, the north pole of magnet 118a may face toward the interface surface 108 whereas the south pole of the magnet 118b is oriented to face the interface surface 108.

In the illustrated embodiment, the inductive power transmitter 102 may include four magnets 188a-d arranged in a square, positioned along the perimeter of the movable assembly 116. The transmit coil 112, shown as a dashed circle, may be positioned central to the square defined by the arrangement of magnets 118a-d.

Correspondingly, an inductive power receiver may include four permanent magnets arranged in a square having the same dimensions as the arrangement on the movable assembly 116. A receive coil may be positioned central to the square defined by the arrangement of magnets in the inductive power receiver. In this manner, when the magnets of the inductive power receiver attract the magnets 118a-d within the inductive power transmitter 102, the movable assembly 116 in the inductive power transmitter 102 may move such that each of the magnets 118a-d attract and align with a corresponding one of the four inductive power receiver magnets. As a result of the alignment, by the magnets 118a-d, of the movable assembly 116, the transmit coil 112 is aligned along a mutual axis with a receive coil within the inductive power receiver. In other examples including polarity patterns, the movable assembly 116 may also be aligned to a particular angle as well as along the mutual axis defined by the receive coil and transmit coil.

Figure 4B:
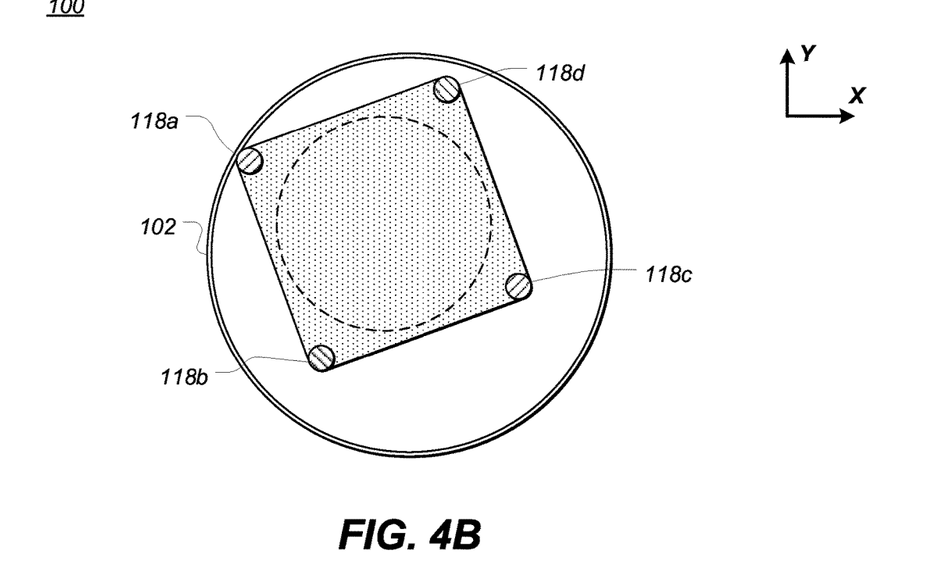
FIG. 4B depicts the example power transfer system of FIG. 4A showing a movable assembly in an arbitrary position.

In these and other embodiments, the movable assembly 116 may be movable or rotatable within the area defined by the housing of the inductive power transmitter 102. In many examples, the movable assembly 116 may be configured to move and/or rotate in two dimensions below the interface (not shown) of the inductive power transmitter 102. For example, FIG. 4B depicts the example power transfer system of FIG. 4A showing a movable assembly in an arbitrary position at an arbitrary rotation.

In certain embodiments, such as illustrated, a housing of the inductive power transmitter 102 may limit the motion of the movable assembly 116. For example, the corner of the movable assembly 116 nearest to the magnet 118a may impact an interior sidewall of the housing of the inductive power transmitter 102. In other embodiments, however, an internal motion limiter may be included. For example, a bumper may be included to limit the motion of the movable assembly in one or more dimensions.

Figure 5A:
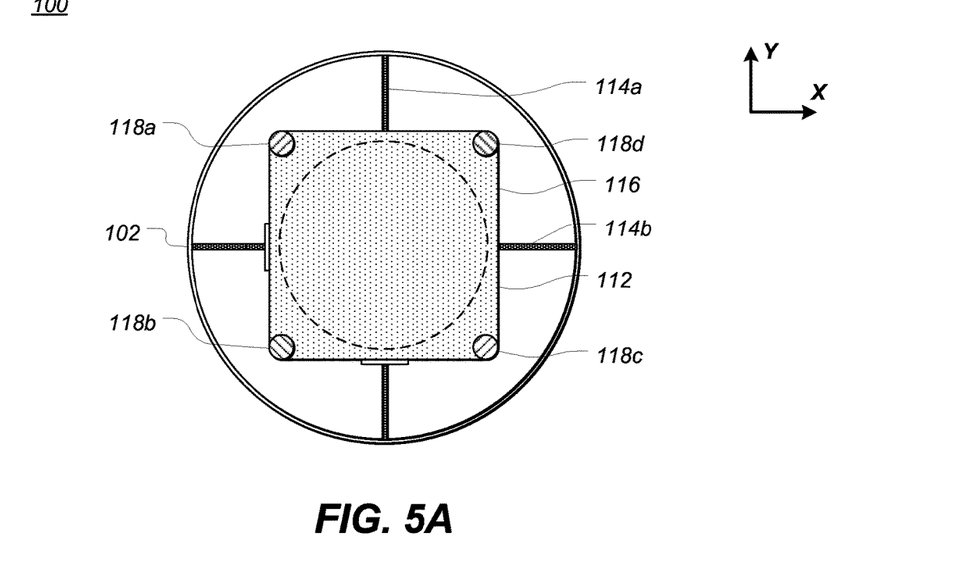
FIG. 5A depicts a bottom cross-section plan view of the example power transfer system of FIG. 1 showing a movable assembly held in a centralized position with springs.

FIG. 5A depicts a bottom cross-section plan view of the example power transfer system 100 of FIG. 1 showing a movable assembly 116 within the housing of the inductive power transmitter 102. The movable assembly 116 is maintained in a substantially central position by linear bearings 114a, 114b in the absence of any other forces. As with other embodiments described herein, the movable assembly 116 may include a structural member (not shown), one or more magnets 118*a-d*, and an inductive power transmitting coil 112. In the illustrated embodiment, a linear bearing 114*b* may allow the assembly to translate along the bearing and thus along the X-axis, and, similarly, the other linear bearing 114*a* may allow the assembly to translate along the Y-axis. In this manner, the transmit coil may translate freely within a two dimensional plane defined by the linear bearings 114*a*, *b*. As with other embodiments described herein, the magnets 118*a-d* may cause the assembly to translate along either or both axes defined by the linear bearings 114*a*, 114*b* when the inductive power receiver is placed on the interface surface and is at least slightly misaligned.

In many embodiments, the movable assembly 116 may return to the substantially central location in the absence of any other forces. For example, the linear bearings as shown in the example embodiment of FIG. 5A may be slightly curved away from the interface surface 108 and positioned with the lowest portion of the curve at the central position as shown in FIG. 5A. In this configuration, gravity can influence the movable assembly 116 to fall back to the central position in the absence of an inductive power receiver 202.

Figure 5B:
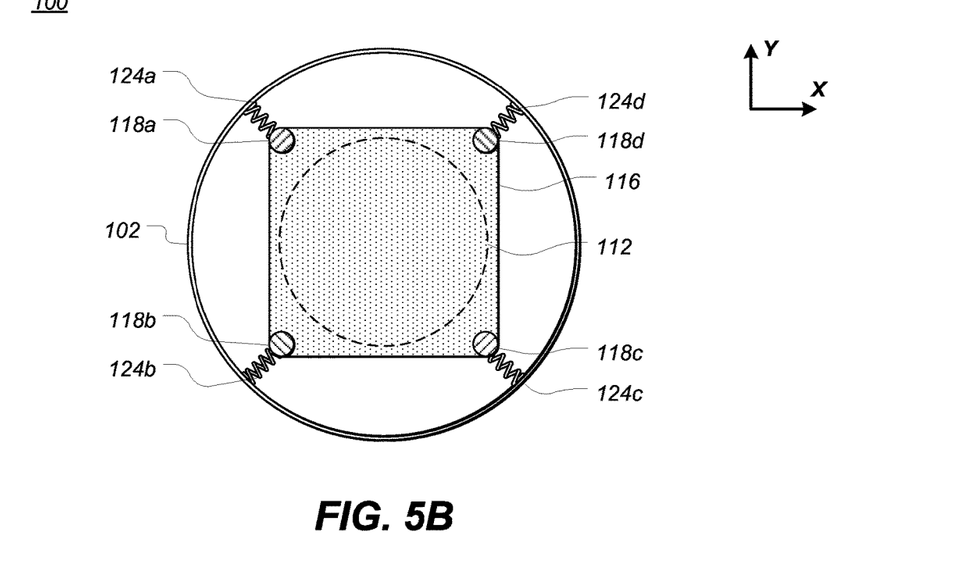
FIG. 5B depicts a bottom cross-section plan view of the example power transfer system of FIG. 1 showing a movable assembly held in a centralized position by linear bearings.

FIG. 5B depicts a bottom cross-section plan view of the example power transfer system 100 of FIG. 1 showing a movable assembly 116 within the housing of the inductive power transmitter 102. The movable assembly 116 is depicted as held in a substantially central position by four centering components, such as the springs 124*a-d*. As with other embodiments described herein, the movable assembly 116 may include a structural member, one or more magnets 118*a-d*, and an inductive power transmitting coil 112.

In the illustrated embodiment, the springs 124*a-d* may couple the movable assembly 116 to the housing of the inductive power transmitter 102. In this manner, the springs 124*a-d* may allow for translation along the X-axis and along the Y-axis when the magnets 118*a-d* are attracted to corresponding magnets within the inductive power receiver 204. In this example embodiment, the springs 124*a-d* may provide a restoring force to the movable assembly 116 to return to the substantially centered position when the inductive power receiver is removed from the interface surface. In other embodiments, the springs 124*a-d* may be positioned elsewhere, or may be coupled to the movable assembly 116 in alternate configurations. In other embodiments, a greater or fewer number of springs may be useful or desirable. For example, a single spring positioned below the movable assembly 116.

Figure 5C:
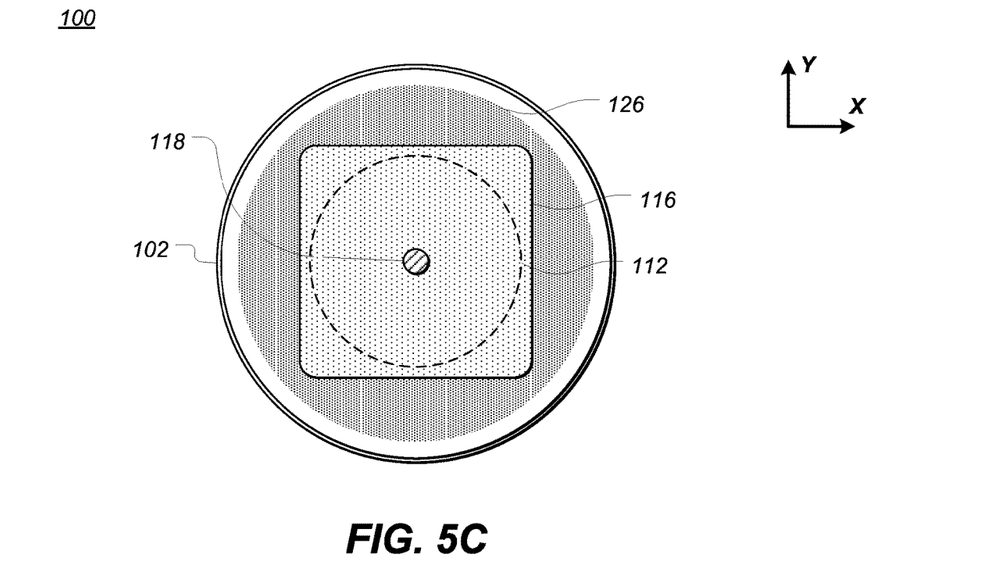
FIG. 5C depicts a bottom cross-section plan view of the example power transfer system of FIG. 1 showing a movable assembly in a centralized position, disposed above a fluid.

FIG. 5C depicts a bottom cross-section plan view of the example power transfer system 100 of FIG. 1 showing a movable assembly 116 within the housing of the inductive power transmitter 102. The movable assembly 116 is disposed within a low-friction fluid 126. The low-friction fluid 126 may be any suitable lubricant or other low viscosity fluid. For example, in certain embodiments, the low-friction fluid 126 may be an oil. In other embodiments, the low-friction fluid 126 may be a ferrofluid. In other embodiments, other fluids may be suitable. Although the movable assembly 116 is illustrated and described herein as submerged within the low-friction fluid 126, such a configuration is not necessary. In certain embodiments, the low-friction fluid 126 may be disposed below the movable assembly 116 or in any other suitable location. In many embodiments, a wall or other retaining member may be used to retain or keep the low-friction fluid 126 in a particular location.

As with other embodiments described herein, the movable assembly 116 may include a structural member (not shown), one or more magnets 118*a-d*, and an inductive power transmitting coil 112. In the illustrated embodiment, the low-friction fluid 126 may permit movable assembly 116 to freely move within to the housing of the inductive power transmitter 102, allowing for translation along the X-axis and along the Y-axis when the magnets 118*a-d* are attracted to corresponding magnets within the inductive power receiver 204.

In certain embodiments, the low-friction fluid 126 may be a ferrofluid. For example, in certain cases, the low-friction fluid 126 may be attracted to the underside of the movable assembly 116 as a result of the magnetic fields of the magnets 118*a-d*. In this manner create a low-friction surface for the assembly to move upon.

In further embodiments, the low friction fluid 126 may be replaced by a low-friction surface element 126. For example, low-friction element 126 may be a fine powder. In another embodiment, the low-friction element 126 may be an array of ball bearings. In another embodiment, the low-friction element 126 may be a low friction coating on one or more interior surfaces of the housing of the inductive power transmitter 102.

Figure 5D:
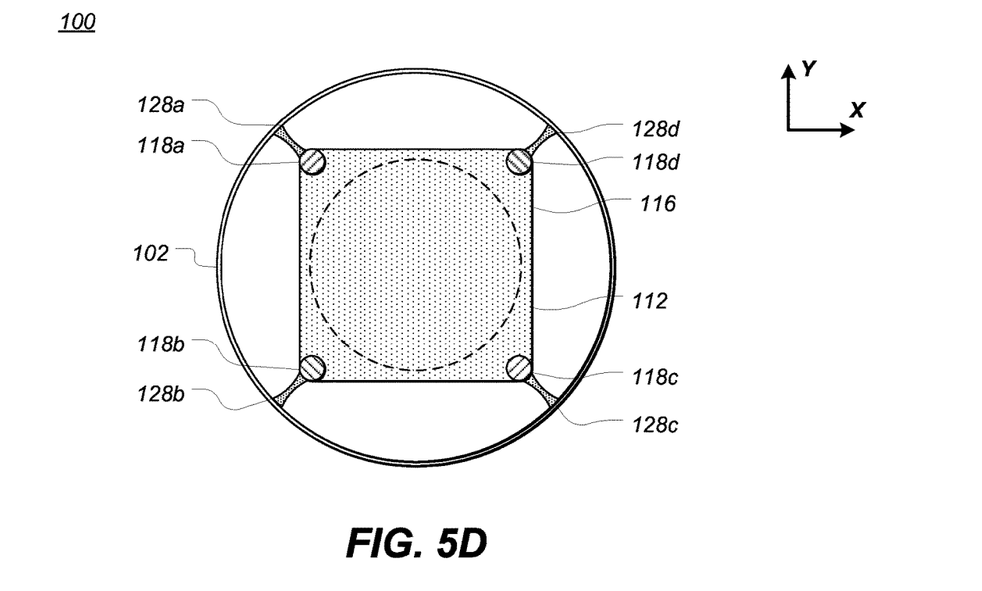
FIG. 5D depicts a bottom cross-section plan view of the example power transfer system of FIG. 1 showing a movable assembly held in a centralized position by tensioned elastomer.

FIG. 5D depicts a bottom cross-section plan view of the example power transfer system 100 of FIG. 1 showing a movable assembly 116 within the housing of the inductive power transmitter 102. The movable assembly 116 is depicted in a substantially central position by four centering components, such as the elastomer 128*a-d*. In many examples, the elastomer may be under tension. As with other embodiments described herein, the movable assembly 116 may include a structural member, one or more magnets 118*a-d*, and an inductive power transmitting coil 112. In the illustrated embodiment, the elastomer 128*a-d* may couple the movable assembly 116 to the housing of the inductive power transmitter 102. In this manner, the elastomer 128*a-d* may allow the assembly to translate along the X-axis and along the Y-axis when the magnets 118*a-d* are attracted to corresponding magnets within the inductive power receiver 204. In this example embodiment, the elastomer 128*a-d* may provide a restoring force to the movable assembly 116 to return to the substantially centered position when the inductive power receiver is removed from the interface surface.

Figure 6:
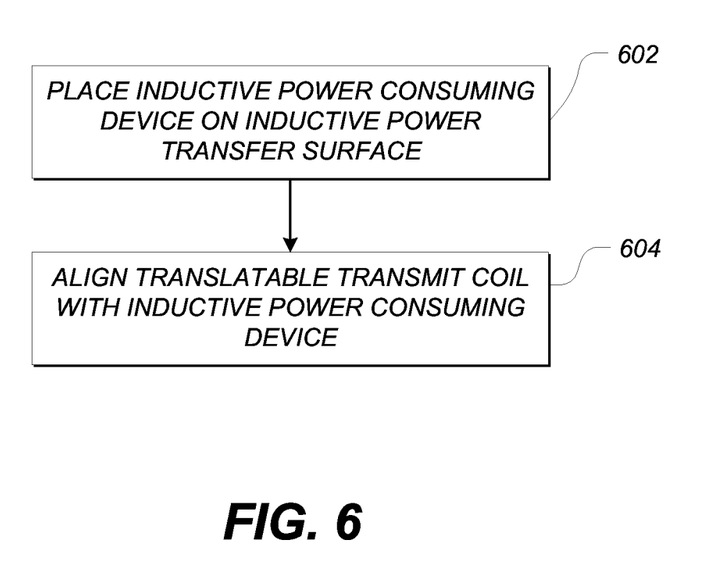
FIG. 6 depicts a flow chart illustrating example steps of a method of aligning a transmit coil with an inductive power consuming device.

FIG. 6 depicts a flow chart illustrating example steps of a method of aligning a transmit coil with an inductive power consuming device. In many examples, a translatable transmit coil is operable to move in any number of directions. For example, a transmit coil may move in any direction within a plane that is parallel to the inductive power transfer surface. In other examples, the transmit coil may move perpendicular as well. In other words, and more particularly, a transmit coil may be configured to freely move below an interface surface. At step 602 an inductive power consuming device may be placed on the inductive power transfer surface. Thereafter, at 604, the transmit coil may be moved into alignment with the inductive power consuming device.

In many examples, the device may be placed at any location on the inductive power transfer surface. In some examples, the inductive power transfer surface may be larger than the cross section of the inductive power consuming device. For example, the inductive power transfer surface may be the surface of a table and an inductive power consuming device may be a portable electronic device such as a cellular telephone. In these examples, when the cellular phone is placed on the table, the transmit coil may be moved in order to align with a receive coil within the cellular phone.

In other examples, the inductive power transfer surface may be smaller than the cross section of the inductive power consuming device. For example, the inductive power transfer surface may be a puck or dock that is configured to attach to a portion of a portable electronic device. In these examples, when the when the dock is placed on the portable electronic device, the transmit coil within the dock may be slightly moved or adjusted in order to more perfectly align with a receive coil within the portable electronic device.

Although the method generally depicted by FIG. 6 describes translating a transmit coil, the method may equally apply to a receive coil within an inductive power consuming device. For example, a receive coil within a portable electronic device may be operable to move in order to more perfectly align with a transmit coil associated with an inductive power transfer surface. In still further examples, both a transmit coil and a receive coil may be operable to move with respect to one another.

Figure 7:
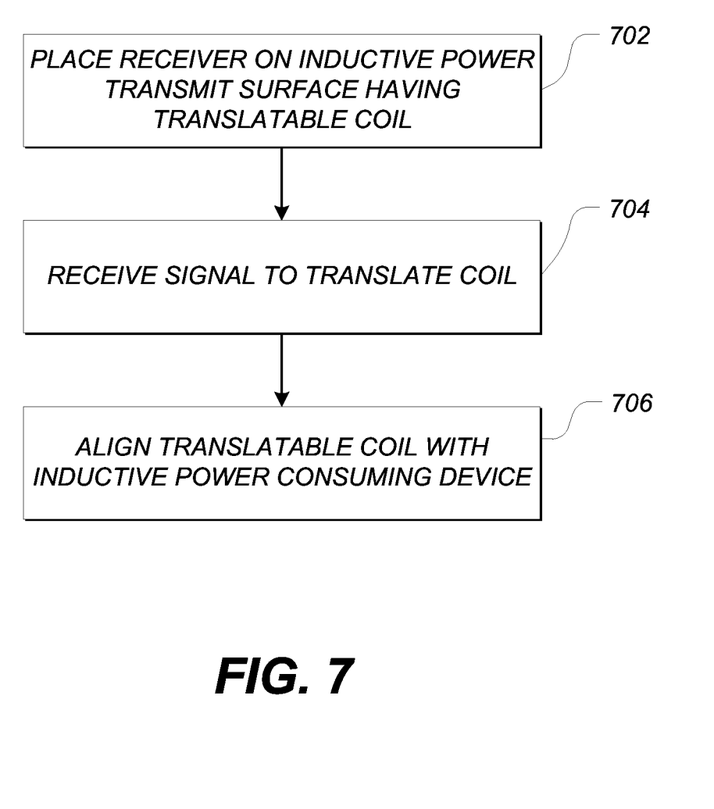
FIG. 7 depicts a flow chart illustrating example steps of a method of aligning a transmit coil with an inductive power consuming device.

FIG. 7 depicts a flow chart illustrating example steps of a method of aligning a transmit coil with an inductive power consuming device. Similar to the method depicted by FIG. 6, the method may begin at 702 by providing an inductive power transfer surface that includes a translatable coil. Thereafter, at step 704 a signal is received including an instruction to move, or translate, the translatable coil. The signal may be sent or received using any suitable means. For example, the signal may be received by a communication interface or any external communication network, device or platform, such as but not limited to wireless interfaces, Bluetooth interfaces, USB interfaces, Wi-Fi interfaces, TCP/IP interfaces, near field communication ("NFC"), optical interfaces, infrared interfaces, network communications interfaces, or any conventional communication interfaces. In other examples, the signal may be received through the translatable coil itself.

In further examples the signal to translate the translatable coil may include information relating to an inductive power consuming device. For example, an inductive power consuming device may communicate via the signal that it is not receiving enough power or that it is not receiving an expected amount of power. In response, at step 706, the translatable coil may be moved, aligned, adjusted, or otherwise translated in order to more perfectly align within the inductive power consuming device.

In further examples, one or more steps of the method as depicted in FIG. 7 may be repeated one or more times. For example, and more particularly, a translatable coil may be moved multiple times before arriving at an ideal location.

In the present disclosure, the methods disclosed, or individual steps thereof, may be implemented as sets of instructions or software readable by a device either sequentially or. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed.

It will be apparent to one of ordinary skill in the art that many modifications and variations are possible in view of the above teachings.

We claim:

1. A wireless power transfer apparatus comprising:
   a housing defining an interface surface for receiving a power receiving apparatus;
   a power supply; and
   a wireless power-transmitting structure coupled to the power supply and disposed within the housing below the interface surface, wherein the wireless power-transmitting structure comprises:
   a structural member;
   an inductive coil coupled to the structural member; and
   a plurality of magnets coupled to the structural member, wherein the plurality of magnets are positioned at each corner of the structural member and do not overlap with the inductive coil;
   wherein the power-transmitting structure is movable within the housing in at least a first direction in response to a magnetic force exerted against the plurality of magnets.

2. The wireless power transfer apparatus of claim 1, wherein motion of the wireless power-transmitting structure is controlled by a centering component, coupled to the wireless power- transmitting structure.

3. The wireless power transfer apparatus of claim 2, wherein the centering component is coupled to the housing.

4. The wireless power transfer apparatus of claim 2, wherein the structural member is positioned below the interface surface and within the housing.

5. The wireless power transfer apparatus of claim 4, wherein the wireless power-transmitting structure is coupled to the structural member and translatable with the structural member.

6. The wireless power transfer apparatus of claim 1, further comprising a magnetic field source coupled to the wireless power-transmitting structure and moves with the magnetic field source.

7. The wireless power transfer apparatus of claim 1, further comprising a controller configured to translate the wireless power-transmitting structure in at least the first direction.

8. The wireless power transfer apparatus of claim 7, the controller further configured to: receive a first signal to translate the wireless power-transmitting structure; and
   in response to receiving the first signal, to translate the wireless power-transmitting structure in the at least first direction.

9. The wireless power transfer apparatus of claim 8, wherein the controller further configured to:
   receive a second signal to translate the wireless power-transmitting structure; and
   in response to receiving the second signal, to translate the wireless power-transmitting structure in at least a second direction.

10. A method of positioning a coil within a wireless inductive power transmitter, comprising:
    placing a wireless inductive power receiver at a location on an interface surface comprising:
    a movable structural member positioned below the interface surface;
    an inductive coil affixed to the structural member; and
    a plurality of magnets coupled to the structural member, wherein the plurality of magnets are positioned at each corner of the structural member and do not overlap with the inductive coil; and translating the structural member below the interface surface to the location in response to a magnetic force exerted against the plurality of magnets.

11. The method of claim 10, further comprising:
receiving a first signal to translate the structural member below the interface surface in a first direction; and
in response to receiving the first signal, translating the structural member in the first direction.

12. The method of claim 11, further comprising:
receiving a second signal to translate the structural member below the interface surface in a second direction; and
in response to receiving the second signal, translating the structural member in the second direction.

13. The method of claim 11, the structural member further configured for translation within a plane substantially perpendicular to the interface surface.

14. A wireless power transfer system comprising:
a wireless power receiving apparatus comprising:
   a first housing;
   a rechargeable battery; and
   a wireless power-receiving structure coupled to the rechargeable battery and disposed within the first housing; and
a wireless power transmitting device comprising:
   a second housing defining an interface surface for receiving a portion of the first housing;
   a power supply; and
   a wireless power-transmitting structure coupled to the power supply and disposed within the second housing below the interface surface, wherein the wireless power-transmitting structure comprises:
      a structural member;
      an inductive coil coupled to the structural member; and
      a plurality of magnets coupled to the structural member, wherein the plurality of magnets are positioned at each corner of the structural member and do not overlap with the inductive coil;
   wherein the power-transmitting structure is movable within the second housing in at least a first direction in response to magnetic forces between the power-receiving apparatus and the power transmitting apparatus.

15. The wireless power transfer system of claim 14, wherein motion of the wireless power-transmitting structure is controlled by a centering component coupled between the wireless power-transmitting structure and the second housing.

* * * * *